United States Patent [19]
Jewell et al.

[11] 3,727,120
[45] Apr. 10, 1973

[54] WIDTH CONTROLLED SAMPLIER PULSING A SAMPLE-HOLD THEREBY EFFECTING A LOW-PASS FILTER FOR A SAMPLE-DATA SERVO

[75] Inventors: George S. Jewell, Ancaster; Robert E. Parker, Dundas; William Dell, Hamilton; Richard J. Etherington, Ancaster; Henry Webber, Dundas, all of Canada

[73] Assignee: Westinghouse Canada Limited, Hamilton, Ontario, Canada

[22] Filed: July 1, 1971

[21] Appl. No.: 158,797

[52] U.S. Cl. ................318/636, 318/621, 318/622, 318/599, 318/577
[51] Int. Cl. ............................................G05b 21/02
[58] Field of Search....................318/608, 636, 621, 318/622, 599

[56] References Cited

UNITED STATES PATENTS 3,513,370  5/1970  Pullen ................................318/608

Primary Examiner—T. E. Lynch
Attorney—R. H. Fox

[57] ABSTRACT

Servo systems may be subject to disturbances if they respond to signals above a certain frequency, if for example, the frequency is related to the natural resonance of the mechanical portion of the servo system. Filters have been used in the past to eliminate this source of instability. The present invention discloses a simple electronic circuit which operates as a filter suitable for use in certain servo systems, specifically of the sample-data servo type. The circuit includes a sample-hold capacitor which is larger than normal whereby it may not charge fully during a single sample period if the sampling pulse is varied in width. Thus, several sample periods may be necessary before the sample-hold capacitor is fully charged and the effect of this circuit is similar to introducing a low-pass filter into the servo system.

3 Claims, 3 Drawing Figures

PATENTED APR 10 1973    3,727,120

WIDTH CONTROLLED SAMPLIER PULSING A SAMPLE-HOLD THEREBY EFFECTING A LOW-PASS FILTER FOR A SAMPLE-DATA SERVO

BACKGROUND OF THE INVENTION

In servo systems it is not uncommon to introduce low pass filters to compensate for system instability or undesired responses. A typical example of such a situation occurs in the case of a line tracing machine of the coordinate drive type where the drive capability is such as to be capable of accelerating the machine at sufficiently high rates so that the resonant frequency of the mechanical apparatus falls within the drive capability. If this situation arises, the machine may be accelerated at its natural frequency and any oscillation which occurs is reinforced by the drive. The resulting oscillation of the machine is obviously unsatisfactory and may, if of sufficient amplitude, become destructive.

Large coordinate drive pattern following machines are particularly susceptible to this problem. An example of such a machine drive is that described in copending patent application Ser. No. 065,212, assigned to the assignee of the present application.

In order to minimize this problem in the past, it has been the custom to introduce a filter in the servo system which eliminates from the servo loop frequencies related to the natural frequency of the machine. Any such filter evidently will have to be selected in accordance with the machine natural frequency, and this may well require custom selection of filter components to suit the situation.

Also, in the case of metal working machines wherein the mechanical apparatus may be large and heavy having a relatively low natural frequency, the resulting larger filter component may be expensive and inconvenient.

It is the purpose of this invention to overcome the foregoing problems and provide a filter which may be readily adjusted to the natural frequency of the servo system and at the same time does not use large and expensive components.

SUMMARY OF THE INVENTION

In accordance with the present invention, the response characteristic of the servo system is limited by preventing this system from responding linearly to rate changes above a certain value. The data is sampled to provide signals to the servo system. If the sample exceeds a certain value, the servo does not respond linearly and its rate of response is limited. This mode of operation is attained by utilizing a hold circuit which has a limited rate of response. If the sample derived shows a great deviation from the previous value, the hold circuit is incapable of assimulating this new value immediately and requires several samples before it attains the new value. Since the signal applied to the servo drive is the signal from the hold circuit, the rate of change of velocity of the drive is thereby limited.

A clearer understanding of our invention may be had from the following description of its application to a line tracer, together with the drawings, in which.

DESCRIPTION OF THE PREFERRED EMBODIMENT

Figure 1:
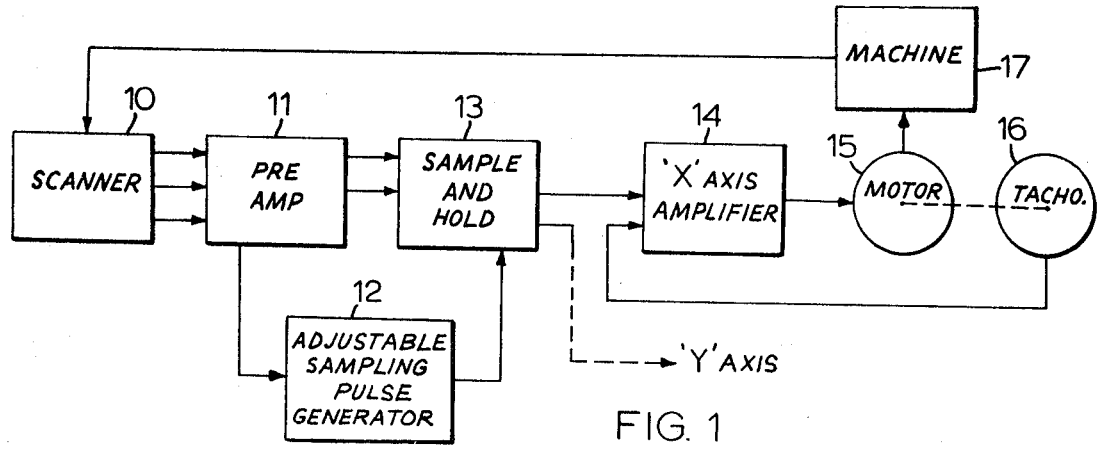
FIG. 1 is a block diagram of a system incorporating the invention.

Considering FIG. 1, there is shown a pattern tracing system including an optical scanner 10, a preamplifier 11, a pulse generator 12, a sample-and-hold circuit 13, a coordinate amplifier 14, a drive motor 15, a tachometer generator 16, and a driven machine 17. For the purpose of simplicity only one coordinate drive system is shown, but it will be understood that in order to follow a pattern, both coordinates must be energized.

For the purpose of describing this invention it may be assumed that the optical scanner 10 circularly scans a line drawing of the desired pattern and produces an impulse each time the circular scan crosses the line. The scanner also produces a pair of reference waveforms indicative of the rotational position of the scan. A clearer understanding of the signals produced and their utilization may be had from the copending application referred to above.

For the purpose of describing this invention, it will be assumed that the impulse produced by the optical scanner is processed by the preamplifier and utilized in the sampling pulse generator 12 to produce a pulse of fixed amplitude commencing upon the occurrence of the impulse. This sampling pulse is then used in the sample-and-hold circuit to produce a sample of one of the reference waveforms produced by the scanner indicative of the scan position, which waveform is usually a sinusoid. The resultant sample will therefore have a value representative of the rotational position of the line with reference to the scan. This sample is applied to a hold circuit which consists of a capacitor which is charged to a voltage equal to the amplitude of the sample. If the sample pulse is used to control the charging time, it will be evident that the determination of whether the charging capacitor ever reaches the value of the sample depends upon the value of the capacitor, the circuit resistance and the amplitude of the sample.

In prior systems, it has been assumed that it was desirable for the capacitor to rapidly reach the value of the sample and thus the capacitor was kept relatively small and the sample time was maintained sufficient to ensure that the capacitor actually reached essentially the same potential as the sample. If, however, the capacitor is made somewhat larger, without making any change to the circuit resistance, a condition can be reached where the time duration of the sample is not sufficient for the capacitor to charge completely to the value of the sample, depending, of course, on the amplitude of the sample and the present voltage on the capacitor; that is, the difference between the previous signal and the new signal value or, in the final analysis, the amount of deviation of the pattern from the present path of the scanner. If the capacity and the circuit resistance are chosen in this range, it will be evident that a variation in the duration of the sample will determine whether the capacitor reaches the same voltage as the sample for a given change of voltage. Therefore, in the system shown in FIG. 1, the sampling pulse generator creates a sampling pulse of variable width.

Figure 2:
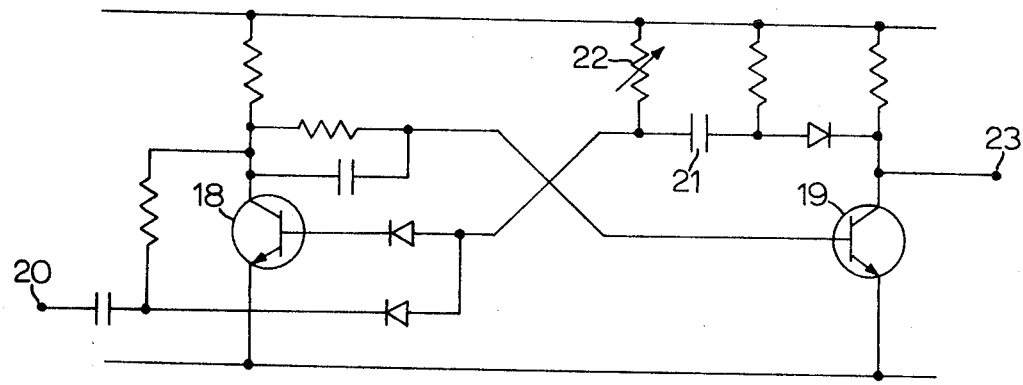
FIGS. 2 and 3 are schematic diagrams of portions of the system show in FIG. 1.
Figure 3:
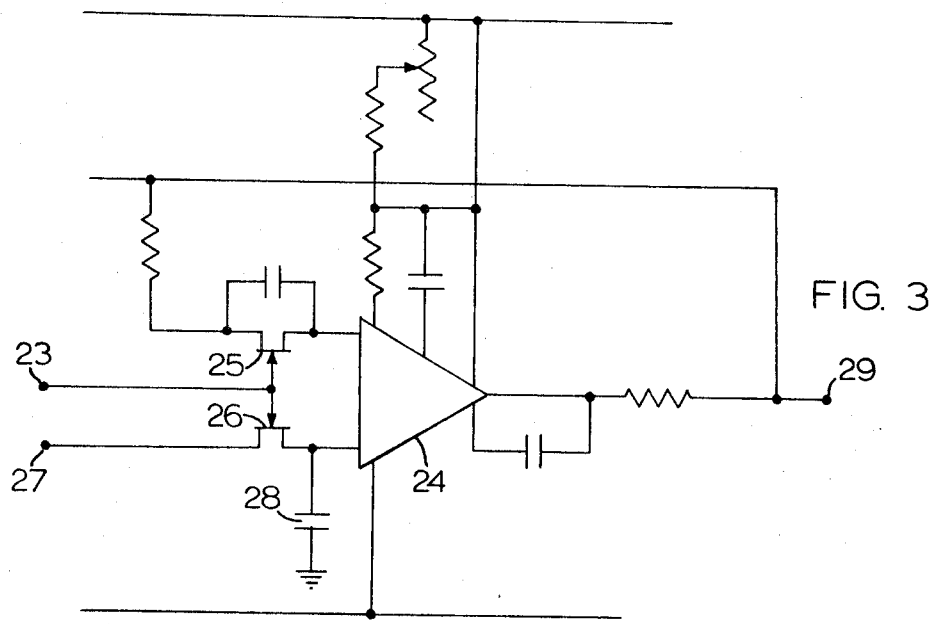

Turning now to FIG. 2, there is shown a circuit suitable for producing the sampling pulse. This circuit consists of a pair of transistors 18 and 19 coupled as a monostable generator. The first transistor 18 is driven by an input from terminal 20. This transistor is normally conductive, thereby causing transistor 19 to be normally nonconductive. The input pulse on terminal 20 tends to reduce the conductivity of transistor 18 thereby tending to increase the conductivity of transistor 19, and the feedback action is such as to cause transistor 18 to become non-conductive and transistor 19 to become fully conductive. The pulse from the collector of transistor 19 is coupled to the base of transistor 18 through capacitor 21. It will be seen that variable resistor 22 constitutes a discharge path for a capacitor 21. By adjustment of resistor 22, the discharge time of capacitor 21 may be adjusted. As capacitor 21 discharges through resistor 22, it reaches a particular value at which the transistor 18 begins to conduct. At this point, by cumulative action, the generator reverts to its stable condition with transistor 18 fully conductive and transistor 19 fully non-conductive. It remains in this state until driven by further input on terminal 20. Resistor 22 therefore provides a variable control for determining the rate of discharge of capacitor 21 and in turn the width of the pulse generated by the circuit. This output pulse from the collector of transistor 19 appears at terminal 23. The output from terminal 23 is then applied to the sample-and-hold circuit 13. The sample-and-hold circuit 13, which is described in the earlier referred to specification, is also shown in FIG. 3 for the sake of completeness.

It will be seen that the circuit includes a differential amplifier 24. The inputs to the amplifier include a pair of FET's 25 and 26. The sampling pulse from terminal 23 is applied to the control electrodes of the FET's 25 and 26. The reference waveform indicative of the rotational position of the scan is applied to terminal 27. The capacitor 28 is also connected to the input terminal of the differential amplifier which is connected to FET 26. When the sampling pulse is applied to terminal 23, FET's 25 and 26 are switched on for the duration of the sampling pulse. Capacitor 28 tends to charge up to the value of the reference signal applied to terminal 27. If there is any difference between the potential on the terminal connected to capacitor 28 and the other terminal of the differential amplifier 24, this difference causes an output of the amplifier which is applied to FET 25 and thence to the other terminal of the differential amplifier, causing the output of the differential amplifier to be a potential equal to the potential on capacitor 28.

It will be seen therefore that the potential of capacitor 28 will be a function of the potential on terminal 27 and the duration of the sampling pulse applied to terminal 23 and also the potential on the capacitor 28 prior to the occurrence of the sampling pulse. Therefore, the output from the sample-and-hold circuit 13 which is applied from terminal 29 to the x-axis amplifier 14 in FIG. 1 will be a function of the direction of the line being traced and to a limited degree, the deviation of the tracer from the pattern. The same sampling pulse generator will be used to supply both the x-axis and the y-axis sample-and-hold circuits. It is therefore possible to simultaneously modify the response characteristics of both axis amplifiers by a simple adjustment of the single resistor 22.

It will be evident that in the system described, resistor 22 provides a variable control for varying the frequency response of the system, by varying the width of the pulse. Other systems may utilize this same principle or alternatively may alter the sampling rate. For example, it will be evident that the ability of the capacitor to attain the same value as the sample in a given time is determined by the number of sampling pulses received in that given time, and therefore the response of the servo system may also be adjusted by varying the sampling rate. In some circumstances it may be more convenient to vary the sampling rate than the sample pulse width, although in the system described above, the width is the most conveniently adjustable factor.

It will also be evident that while described in association with a line tracing servo system, the filter is of general application in sample-data servo systems and provides a very simple and economical low pass filter for such systems.

The embodiments of the invention in which an exclusive property or privilege is claimed are defined as follows:

1. In a sample-data serve system utilizing a sample-and-hold circuit comprising a chargeable capacitor, means to limit the rate of charge of the capacitor, means to apply a sampling pulse to the sample-and-hold circuit and means to control the duration of transfer of the sample to the hold circuit in any fixed time period.

2. In a sample-data servo system including means to produce a sampling pulse and means to store in a capacitor a sample representative of the signal during the period of the sampling pulse characterized in that the charging circuit for the capacitor includes a resistor to limit the rate of charge of the capacitor and the duration of the sampling pulse is adjustable whereby the frequency response of the servo system is adjustable.

3. In a sample-data servo system including means to produce a sampling pulse and means to store in a capacitor a sample representative of the signal during the period of the sampling pulse characterized in that the charging circuit for the capacitor includes a resistor to limit the rate of charge of the capacitor and the frequency of the sampling pulse is adjustable whereby the frequency response of the servo system is adjustable.

* * * * *